(12) United States Patent
Hsu

(10) Patent No.: US 9,448,396 B2
(45) Date of Patent: Sep. 20, 2016

(54) COLOR DEGRADATION COMPENSATION METHOD

(71) Applicant: NATIONAL CHUNG CHENG UNIVERSITY, Chia-yi (TW)

(72) Inventor: Wei-Yen Hsu, Chia-yi County (TW)

(73) Assignee: NATIONAL CHUNG CHENG UNIVERSITY, Chia-Yi (TW)

( * ) Notice: Subject to any disclaimer, the term of this patent is extended or adjusted under 35 U.S.C. 154(b) by 257 days.

(21) Appl. No.: 14/138,114

(22) Filed: Dec. 22, 2013

(65) Prior Publication Data

US 2015/0103157 A1    Apr. 16, 2015

(30) Foreign Application Priority Data

Oct. 11, 2013  (TW) .............................. 102136795 A

(51) Int. Cl.
- *H04N 7/18* (2006.01)
- *G02B 21/36* (2006.01)
- *H04N 1/387* (2006.01)
- *H04N 1/60* (2006.01)

(52) U.S. Cl.
CPC .......... *G02B 21/367* (2013.01); *H04N 1/3876* (2013.01); *H04N 1/6052* (2013.01)

(58) Field of Classification Search
CPC .............................. H04N 9/646; H04N 5/332
USPC .................................................... 348/79, 164
See application file for complete search history.

(56) References Cited

U.S. PATENT DOCUMENTS

| | | | |
|---|---|---|---|
| 6,813,040 B1 * | 11/2004 | Uchino | H04N 1/2158 358/1.9 |
| 2010/0171809 A1 * | 7/2010 | Fujiyoshi | G02B 21/367 348/36 |
| 2013/0093783 A1 * | 4/2013 | Sullivan | G09G 5/06 345/601 |
| 2014/0185927 A1 * | 7/2014 | Kawabata | G01J 3/50 382/162 |

* cited by examiner

*Primary Examiner* — Jorge L Ortiz Criado
*Assistant Examiner* — Amir Shahnami
(74) *Attorney, Agent, or Firm* — CKC & Partners Co., Ltd.

(57) ABSTRACT

A color degradation compensation method includes the steps as follows. Two images are captured by an image capturing device, wherein the two images have an overlapped area. A semi-Gaussian model is constructed. At least one position in the overlapped area is selected and color values of a plurality of points in the position on each of the two images are read, wherein the points of each image are corresponded to the same position in the overlapped area. A degradation standard deviation of the two color values is calculated by the semi-Gaussian model. The color values of the two images are calibrated to compensated color values through the semi-Gaussian model again in accordance with the degradation standard deviation.

8 Claims, 5 Drawing Sheets

COLOR DEGRADATION COMPENSATION METHOD

RELATED APPLICATIONS

The application claims priority to Taiwan Application Serial Number 102136795, filed on Oct. 11, 2013, which is herein incorporated by reference.

BACKGROUND

1. Technical Field

The present disclosure relates to a color degradation compensation method, especially relates to a color degradation compensation method for a microscope image.

2. Description of Related Art

An image capturing device such as a microscope, a digital camera or a digital recorder essentially includes an optical lens assembly and an analog/digital converter (ex. CMOS or CCD senor). When a light is irradiated to an object, the light emitted from the object is captured by the image capturing device, and is transformed by the analog/digital converter so as to form a digital image readable by an electronic device. The light irradiated to the object is usually a white light, which is composed of several kinds of color lights. In a color system, three primary colors red, green and blue are utilized for generating different colors. However, different color lights have different optical characteristics such as wavelength or refractive index, etc. When different color lights pass through the optical lens assembly, chromatic dispersion will be occurred due to different focusing of each of the color lights, and the chromatic dispersion will form a chromatic aberration (color degradation) of the image. The chromatic aberration of the image will lead to obvious color shift between the edge area and the center area of the image. For example, a purple fringe occurred on the digital camera image; or a color shift between an edge and a center of the microscope image.

For solving the chromatic aberration of the image, conventionally, a hardware calibrating method or a software calibrating method is proposed.

In the hardware calibrating method, physical parameters such as curve radius, distance and shape of each lens element are modified for reducing the chromatic aberration. In the software calibrating method, an image processing procedure is utilized for calibrating the color values of each point of the image for reducing the chromatic aberration.

In the aforementioned calibrating methods, the hardware calibrating method requires high precision adjustments on each lens element of the optical lens assembly, thus a complicated process is produced, and a manufacturing cost is high. In the software calibrating method, although several image calibration software have been provided, however, different algorithms of each of the image calibration software leads to different calibrating effect.

SUMMARY

According to one aspect of the present disclosure, a color degradation compensation method is provided. The color degradation compensation method includes the steps as follows. Two images are captured by an image capturing device, wherein the two images have an overlapped area. A calculating procedure is constructed. At least one position in the overlapped area is selected and color values of a plurality of points in the position on each of the two images are read, wherein the points of each image are corresponded to the same position in the overlapped area. A ratio of the two color values is calculated. A degradation standard deviation of the two color values is calculated by the calculating procedure. The color values of the two images are calibrated to compensated color values through the calculating procedure in accordance with the degradation standard deviation.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
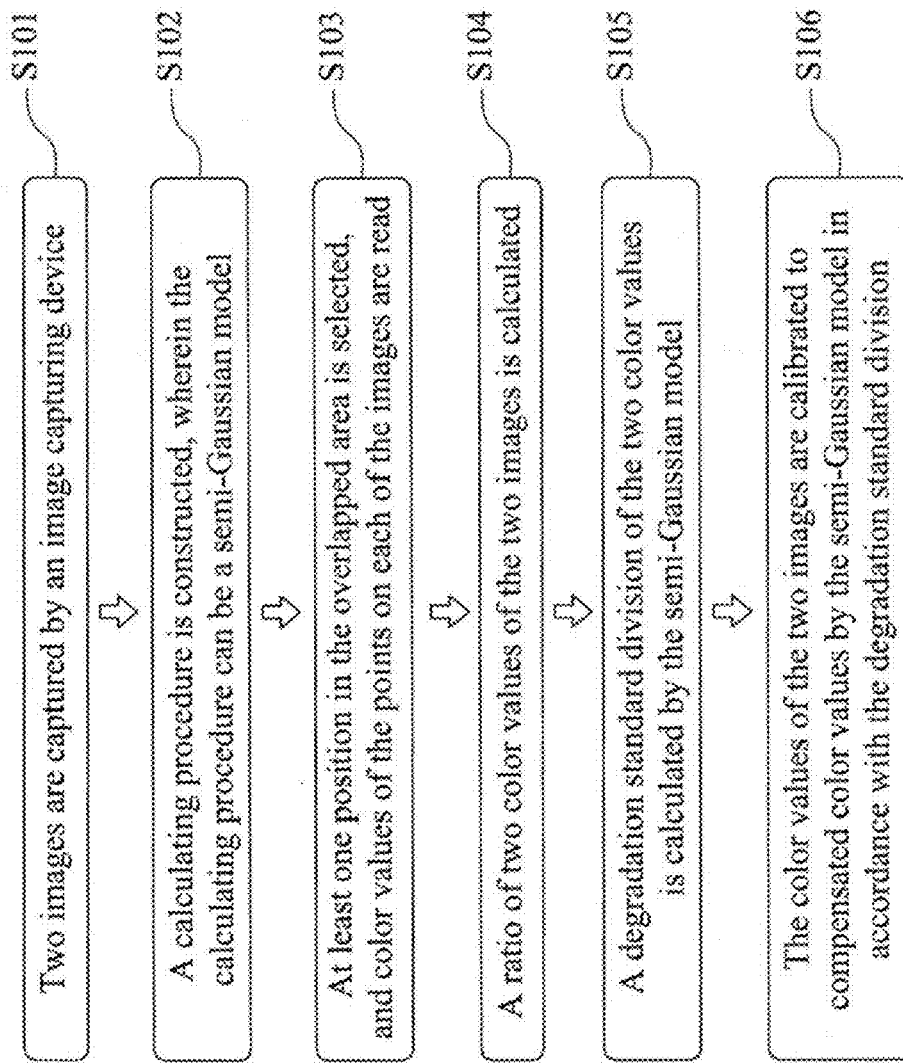
FIG. 1 is a flow chart showing a color degradation compensation method according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

The present disclosure provides a color degradation compensation method for an image. Two images are captured by an image capturing device, wherein the two images have an overlapped area. Points of each image are selected, wherein the points are corresponded to the same position in the overlapped area, then color values of the points on each of the images are read. A ratio of the two colors is calculated, and a semi-Gaussian model is applied to obtain a degradation standard deviation of each color value. The semi-Gaussian model is applied again, and compensated color values of the two images can be obtained. The color values of the two images can be calibrated to correct color values in accordance with the degradation standard deviation of each color value.

FIG. 1 is a flow chart showing a color degradation compensation method according to one embodiment of the present disclosure. The color degradation compensation method is applied on images captured b an image capturing device. The color degradation compensation method includes the following steps:

S101, two images are captured by an image capturing device;

S102, a calculating procedure is constructed, wherein the calculating procedure can be a semi-Gaussian model;

S103, at least one position in the overlapped area is selected, and color values of the points on each of the images are read;

S104, a ratio of two color values of the two images is calculated;

S105, a degradation standard division of the two color values is calculated by the semi-Gaussian model; and S106, the color values of the two images are calibrated to compensated color values by the semi-Gaussian model in accordance with the degradation standard division.

In S101, the two images have an overlapped area, and the image capturing device can be a microscope, a digital camera, a digital recorder or a scanner. Moreover, the two images can be two adjacent images from one object or two adjacent images from any two objects. In one example of this embodiment, the color degradation compensation method of the present disclosure is especially suitable for the images captured by a microscope.

In S103, the points are corresponded to the same position in the overlapped area. Moreover, the color degradation compensation method can be applied to various color systems. According to an example, a color system utilizes three primary colors red, green and blue (RGB system) can be applied. In the RGB system, color values from 0 to 255 are used for representing different colors, and each color can be recorded as 8 bit. Therefore, each color has 256 brightness levels, and multiplication of the three colors can represent 167777216 brightness levels, which is called 24 bit true color. According to another example, a CMYK system can be applied. In the CMYK system, cyan, magenta, yellow and black are four basic colors. Each color in the CMYK system can be represented by color values 0 to 1. The color degradation compensation method of the present disclosure can also be applied to other color system, which is not limited to the foregoing color systems.

For better understanding the color degradation compensation method of the present disclosure, a semi-Gaussian model is used for describing the color degradation compensation method of the present disclosure.

First, assume that a color degradation of an image can be expressed as a semi-Gaussian model. The semi-Gaussian model can be expanded as follows:

$$Gau(X, \sigma) = A\exp\left(-\frac{\|X - C\|^2}{2\sigma^2}\right) \quad (1)$$

where X is a coordinate value of any points in the overlapped area; A is a maximum color value, referred to a white color; C is a coordinate value of the center point of the image; and $\|X-C\|$ is a distance between X and C. When X is located at C, $Gau(X, \sigma)$ is equal to A.

The aforementioned formula shows that the color degradation between center area and edge area of art image.

Figure 2:
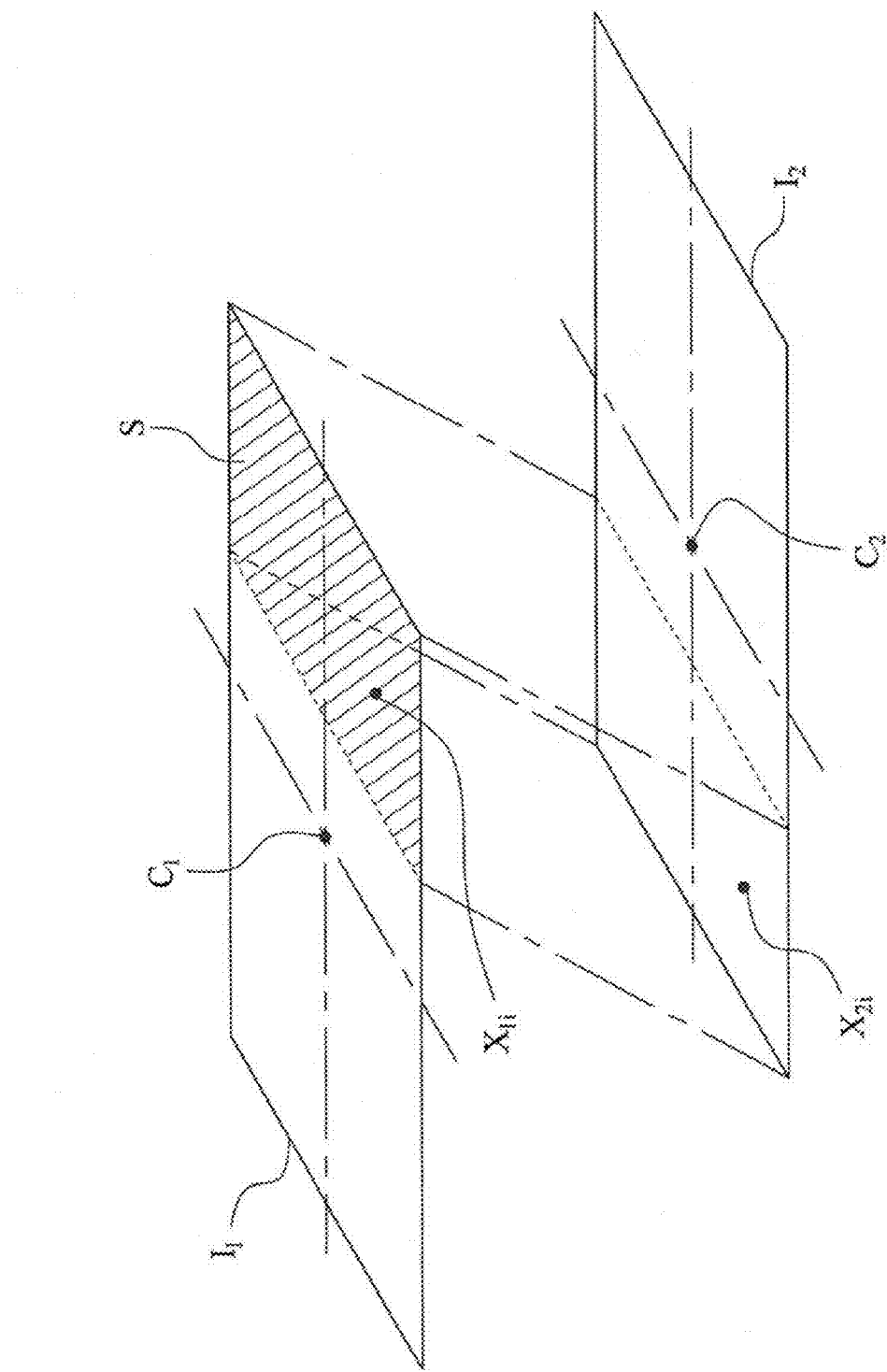
FIG. 2 is a schematic view showing an application of the color degradation compensation method of FIG. 1.

FIG. 2 is a schematic view showing an application of the color degradation compensation method of FIG. 1. In FIG. 2, the semi-Gaussian model is applied to two images $I_1$ and $I_2$. The two images $I_1$ and $I_2$ have an overlapped area S. $C_1$ and $C_2$ are the coordinate values of center points of images $I_1$ and $I_2$ respectively. $X_{1i}$ and $X_{2i}$ are coordinate values of any points of the same position (overlapped points) corresponded to images $I_1$ and $I_2$ in the overlapped area S. A distance between $X_{1i}$ and $C_1$ can be not equal to a distance between $X_{2i}$ and $C_2$. $O_{1i}$ and $O_{2i}$ are the color values of the points $X_{1i}$ and $X_{2i}$ on the images $I_1$ and $I_2$ respectively. $O_{1i}^R \cdot O_{1i}^G$ and $O_{1i}^B$ is color value of red color portion, green color portion and blue color portion of $O_{1i}$, respectively. A correlation between images I1 and I2 can be expanded as follows:

$$\prod_{i=1}^{N} \frac{O_{1i}^R}{O_{2i}^R} = \prod_{i=1}^{N} \frac{Gau(X_{1i}, \sigma_R)}{Gau(X_{2i}, \sigma_R)} \quad (2)$$

$$= \exp\left(-\frac{\sum_{i=1}^{N}\|X_{1i} - C_i\|^2 - \sum_{i=1}^{N}\|X_{2i} - C_i\|^2}{2\sigma_R^2}\right) \quad (3)$$

And then, $$\sigma_R = \sqrt{\frac{-\sum_{i=1}^{N}\|X_{1i} - C_1\|^2 + \sum_{i=1}^{N}\|X_{2i} - C_2\|^2}{2 \cdot \log\left(\prod_{i=1}^{N} \frac{O_{1i}^R}{O_{2i}^R}\right)}} \quad (4)$$

where N is a number of all points in the overlapped area S of the two images I1 and I2; $\sigma_R$ is a degradation standard division of the red color portion. The degradation standard division of the other color portions can also be expanded as follows:

$$\sigma_G = \sqrt{\frac{-\sum_{i=1}^{N}\|X_{1i} - C_1\|^2 + \sum_{i=1}^{N}\|X_{2i} - C_2\|^2}{2 \cdot \log\left(\prod_{i=1}^{N} \frac{O_{1i}^G}{O_{2i}^G}\right)}} \quad (5)$$

And, $$\sigma_B = \sqrt{\frac{-\sum_{i=1}^{N}\|X_{1i} - C_1\|^2 + \sum_{i=1}^{N}\|X_{2i} - C_2\|^2}{2 \cdot \log\left(\prod_{i=1}^{N} \frac{O_{1i}^B}{O_{2i}^B}\right)}} \quad (6)$$

For reducing the influence of noise, all points corresponded to all positions in the overlapped area S are used for calculating $\sigma_R \cdot \sigma_G$ and $\sigma_B$.

Then, according to $\sigma_R \cdot \sigma_G$ and $\sigma_B$, the semi-Gaussian model is applied again, and compensated color values of all points (including non-overlapped area) on the image $I_i$ (i=1, 2) can be calibrated. Therefore, the color degradation can be eliminated by introducing the degradation standard divisions $\sigma_R \cdot \sigma_G$ and $\sigma_B$ to the semi-Gaussian model. The calculation can be expanded as follows:

$$\hat{O}_{ij}^R = O_{ij}^R / \exp\left(-\frac{\|Y_{ij} - C_i\|^2}{2(\sigma_R)^2}\right) \quad (7)$$

$$\hat{O}_{ij}^G = O_{ij}^G / \exp\left(-\frac{\|Y_{ij} - C_i\|^2}{2(\sigma_G)^2}\right) \quad (8)$$

$$\hat{O}_{ij}^B = O_{ij}^B / \exp\left(-\frac{\|Y_{ij} - C_i\|^2}{2(\sigma_B)^2}\right) \quad (9)$$

where $O_{ij}^R$ is a color value of red color portion of the point $Y_{ij}$ on the image $I_i$ (before calibration); $\hat{O}_{ij}^R$ is an compensated color value of the red color portion calibrated from $O_{ij}^R$ in accordance with $\sigma_R$; and j is an points on image $I_i$ ( including non-overlapped area) Similarly, the compensated color values of the green color portion and the blue color portion can also be calibrated by the same method. Finally, after combining the compensated red color portion, green color portion and blue color portion, two full-colored images with compensated color values can be obtained.

From above, a semi-Gaussian model for descripting color degradation of an mage is constructed. By capturing two images having an overlapped area S from an image capturing device, the semi-Gaussian model is used for obtaining the degradation standard division of the colors in accordance with the ratio of the two color values of each image. The semi-Gaussian model is also used for obtaining the compensated color value of the two images in accordance with the degradation standard division. Therefore, correct color values of the two images can be obtained.

The color degradation compensation method of the present disclosure can easily be programmed to computer software, and can be applied on an image capturing device combined with a computer system. It is not necessary to perform complicated adjustment on the hardware of the image capturing device, by an image processing software utilizing color degradation method of the present disclosure; the color degradation of the two images can be compensated easily and efficiently.

Figure 3:
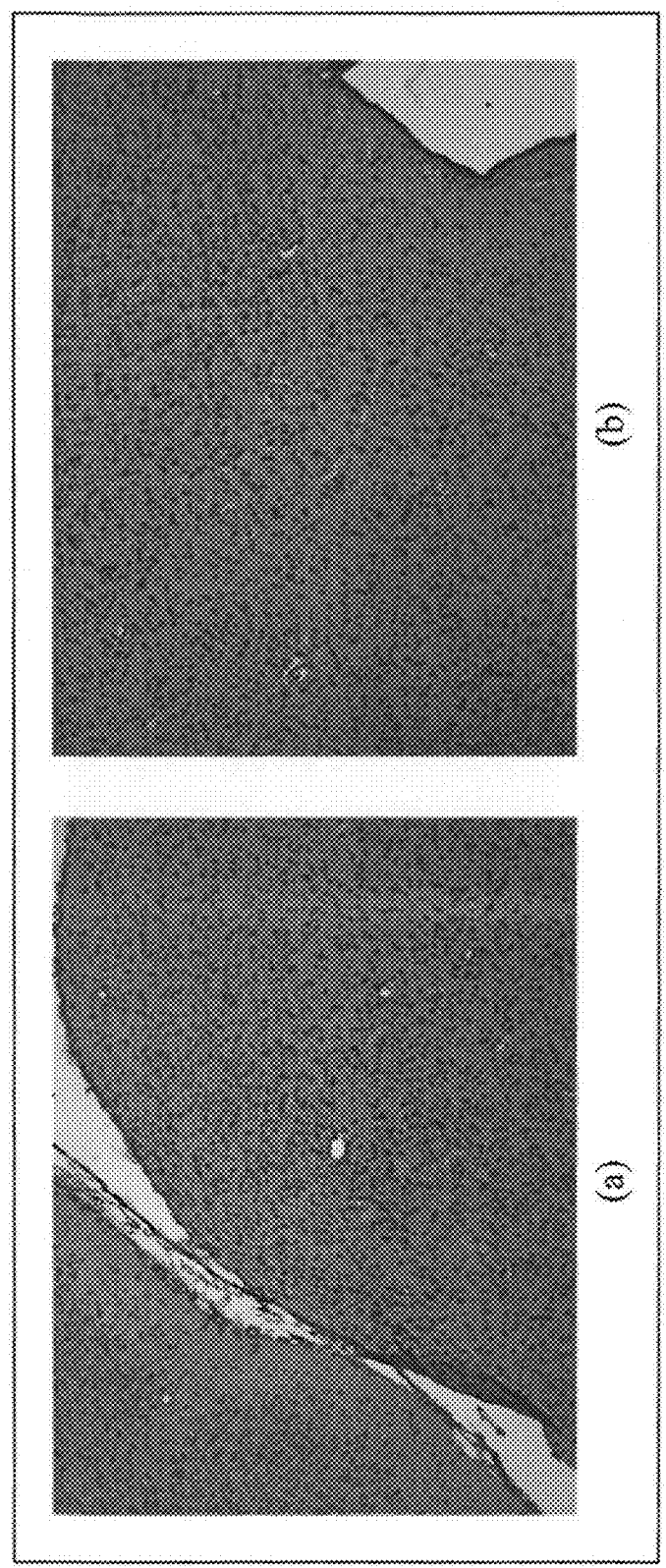
FIG. 3 shows two adjacent images (a) and (b) captured by the microscope without applying the color degradation compensation method of the present disclosure.
Figure 4:
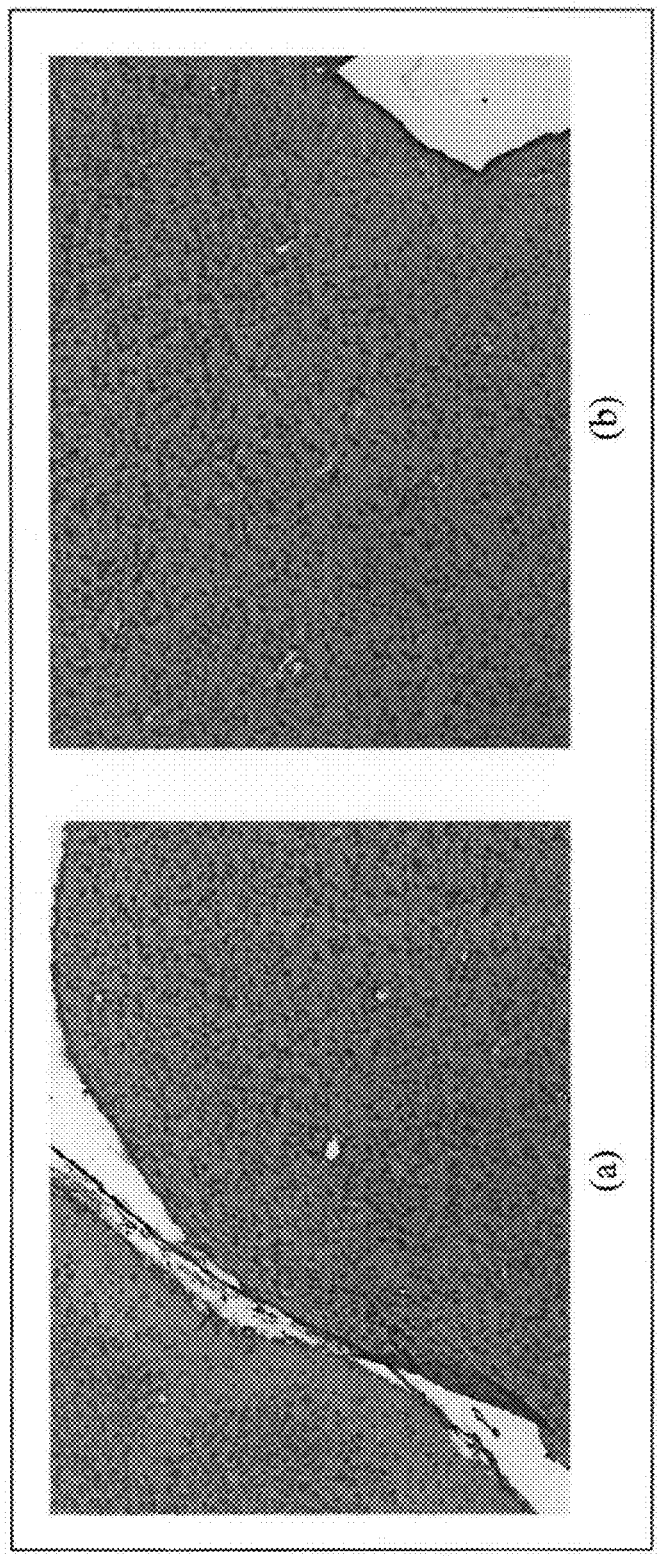
FIG. 4 shows the image (a) and the image (b) calibrated by the color degradation compensation method.
Figure 5:
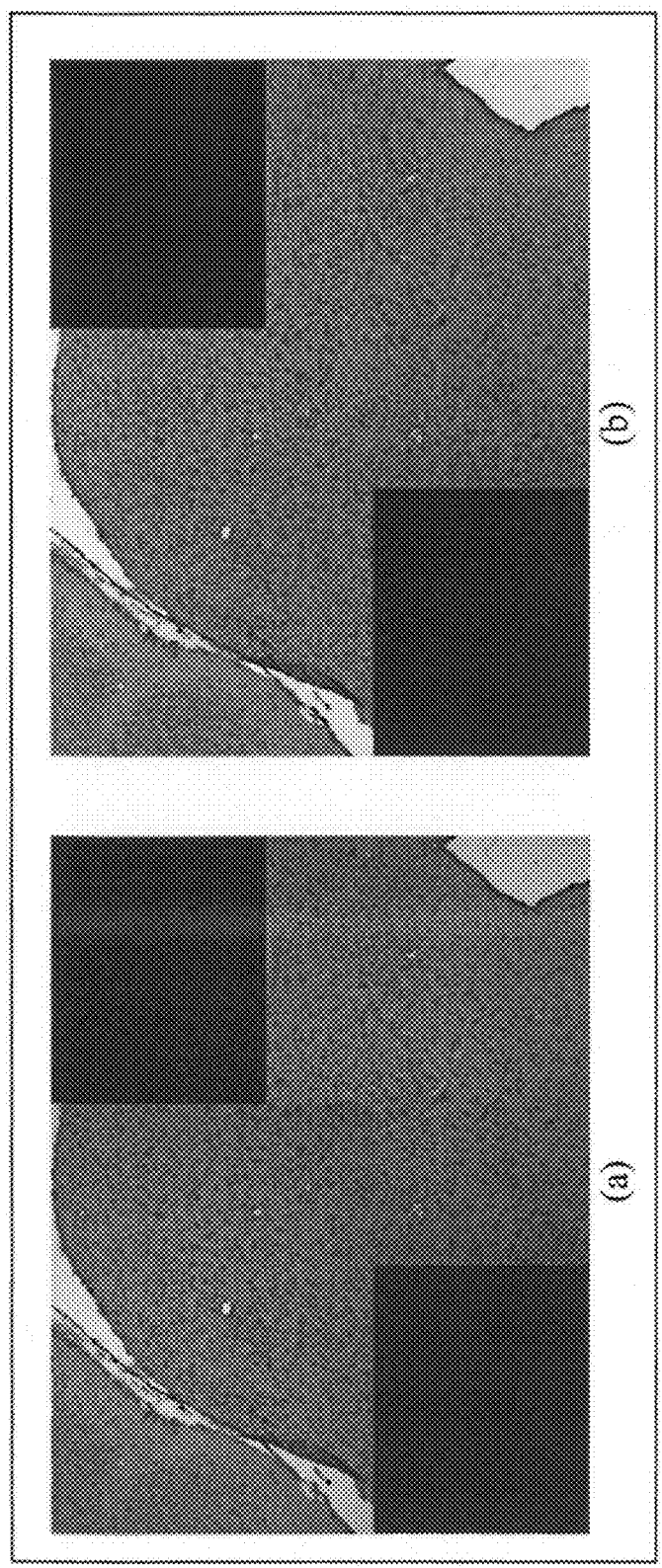
FIG. 5 is a comparison of the image (a) and the image (b) before and after applying the color degradation compensation method of the present disclosure.

Please refer to the attached files. FIG. 3 to FIG. 5 is comparison pictures of two images applying and without applying the color degradation compensation method of the present disclosure. In FIG. 3, an image (a) and an image (b) are two adjacent images captured by the microscope without applying the color degradation compensation method. It is clearly shown that both the image (a) and the image (b) have serious color degradation. The image (a) is degraded to blue color; and the image (b) is degraded to red color.

In FIG. 4, the image (a) and the image (b) are calibrated by the color degradation compensation method. In FIG. 4, it is shown that the color degradation of the two images (a) and (b) are effectively compensated. Correct color of the images (a) and (b) are obtained. In FIG. 5, a comparison of the image (a) and the image (b) before and after applying the color degradation compensation method of the present disclosure is showed respectively, it is obvious that the image (a) and the image (b) have great improvement on the color degradation after applying the color degradation compensation method of the present disclosure.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A color degradation compensation method for an image, comprising:

capturing two images by only an image capturing device, wherein the two images have an overlapped area;

constructing, by a processor, a semi-Gaussian model, wherein the semi-Gaussian model is represent as:

$$Gau(X, \sigma) = A\exp\left(-\frac{\|X-C\|^2}{2\sigma^2}\right);$$

where X is a coordinate value of any points in the overlapped area; A is a maximum color value, referred to a white color; C is a coordinate value of the center point of the image; and $\|X-C\|$ is a distance between X and C;

applying, by a processor, the semi-Gaussian model to the two images, wherein a correlation between the two images is represented as:

$$\prod_{i=1}^{N} \frac{O_{1i}^R}{O_{2i}^R} = \prod_{i=1}^{N} \frac{Gau(X_{1i}, \sigma_R)}{Gau(X_{2i}, \sigma_R)}; \text{ and}$$

$$= \exp\left(-\frac{\sum_{i=1}^{N}\|X_{1i}-C_1\|^2 - \sum_{i=1}^{N}\|X_{2i}-C_2\|^2}{2\sigma_R^2}\right);$$

where $C_1$ and $C_2$ are the coordinate values of center points of the two images respectively: $X_{1i}$ and $X_{2i}$ are coordinate values of any points of the same position (overlapped points) corresponded to the two images respectively in the overlapped area S; $O_{1i}$ and $O_{2i}$ are the color values of the points $X_{1i}$ and $X_{2i}$ on the two images respectively; and $O_{1i}^R$ and $O_{2i}^R$ are color values of red color portion of $O_{1i}$ and $O_{2i}$ respectively;

calculating, by a processor, a degradation standard division of a red color portion, a degradation standard division of a green color portion and a degradation standard division of a blue color portion respectively, wherein the degradation standard division of each color portion is represented as:

$$\sigma_R = \sqrt{\frac{-\sum_{i=1}^{N}\|X_{1i}-C_1\|^2 + \sum_{i=1}^{N}\|X_{2i}-C_2\|^2}{2\cdot\log\left(\prod_{i=1}^{N}\frac{O_{1i}^R}{O_{2i}^R}\right)}};$$

$$\sigma_G = \sqrt{\frac{-\sum_{i=1}^{N}\|X_{1i}-C_1\|^2 + \sum_{i=1}^{N}\|X_{2i}-C_2\|^2}{2\cdot\log\left(\prod_{i=1}^{N}\frac{O_{1i}^G}{O_{2i}^G}\right)}}; \text{ and}$$

$$\sigma_B = \sqrt{\frac{-\sum_{i=1}^{N}\|X_{1i}-C_1\|^2 + \sum_{i=1}^{N}\|X_{2i}-C_2\|^2}{2\cdot\log\left(\prod_{i=1}^{N}\frac{O_{1i}^B}{O_{2i}^B}\right)}};$$

where $O_{1i}^R$, $O_{1i}^G$ and $O_{1i}^B$ are color values of the red color portion, the green color portion and the blue color portion of $O_{1i}$ respectively; $O_{2i}^R$, $O_{2i}^G$ and $O_{2i}^B$ are color values of the red color portion, the green color portion and the blue color portion of $O_{2i}$ respectively; $\sigma_R, \sigma_G$ and $\sigma_B$ are the degradation standard divisions of each color;

eliminating, by a processor, color degradation of all points on the overlapped area and a non-overlapped area of each of the two images by applying $\sigma_R$, $\sigma_G$ and $\sigma_B$ to the semi-Gaussian model again, wherein compensated color values is generated by the following relationship:

$$\hat{O}_{ij}^{R} = O_{ij}^{R} \bigg/ \exp\left(-\frac{\|Y_{ij} - C_i\|^2}{2(\sigma_R)^2}\right);$$

$$\hat{O}_{ij}^{G} = O_{ij}^{G} \bigg/ \exp\left(-\frac{\|Y_{ij} - C_i\|^2}{2(\sigma_G)^2}\right); \text{ and}$$

$$\hat{O}_{ij}^{B} = O_{ij}^{B} \bigg/ \exp\left(-\frac{\|Y_{ij} - C_i\|^2}{2(\sigma_B)^2}\right);$$

where $O_{ij}^{R}$, $O_{ij}^{G}$ and $O_{ij}^{B}$ are color values of the red color portion, the green color portion and the blue color portion of the point $Y_{ij}$ on the image $I_I$ (before calibration); $\hat{O}_{ij}^{R}$, $\hat{O}_{ij}^{G}$ and $\hat{O}_{ij}^{B}$ are compensated color values of the red color portion, the green color portion and the blue color portion calibrated from $O_{ij}^{R}$, $O_{ij}^{G}$ and $O_{ij}^{B}$ in accordance with $\sigma_R$, $\sigma_G$ and $\sigma_B$ (after calibration); j is any points on the image $I_i$ (including the overlapped area and the non-overlapped area); and N is a number of all points in the overlapped area S of the two images $I_1$ and $I_2$; and compositing $\hat{O}_{ij}^{R}$, $\hat{O}_{ij}^{G}$, and $\hat{O}_{ij}^{B}$ and obtaining two compensated images $I_1$ and $I_2$.

2. The color degradation compensation method of claim 1, wherein the color values of the positions in the overlapped area and outside of the overlapped area of the two images are calibrated to the compensated color values.

3. The color degradation compensation method of claim 1, wherein the color values are corresponded to a red color, a green color or a blue color.

4. The color degradation compensation method of claim 1, wherein the color values corresponded to a cyan color, a magenta color, a yellow color or a black color.

5. The color degradation compensation method of claim 1, wherein the image capturing device is a microscope.

6. The color degradation compensation method of claim 1, wherein the image capturing device is a digital camera or a digital recorder.

7. The color degradation compensation method of claim 1, wherein a distance from the points corresponded to the same position in the overlapped area on each of the two images to the center of each of the two images are different.

8. The color degradation compensation method of claim 1, wherein the two images are two adjacent images from one object or two adjacent images from any two objects.

* * * * *